(12) United States Patent
Aoshima

(10) Patent No.: US 6,897,579 B2
(45) Date of Patent: May 24, 2005

(54) MOTOR

(75) Inventor: Chikara Aoshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 10/252,376

(22) Filed: Sep. 24, 2002

(65) Prior Publication Data

US 2003/0062801 A1 Apr. 3, 2003

(30) Foreign Application Priority Data

Sep. 28, 2001 (JP) .................................... 2001-299524
Jan. 17, 2002 (JP) .................................... 2002-008525

(51) Int. Cl.⁷ ............................................. H02K 37/12
(52) U.S. Cl. .............................. 310/49 R; 310/156.32; 310/257; 310/268; 310/40 MM
(58) Field of Search ........................ 310/40 MM, 49 R, 310/156.32, 156.36, 268, 156.37, 162–164, 254, 256, 257

(56) References Cited

U.S. PATENT DOCUMENTS

| | | | | |
|---|---|---|---|---|
| 3,330,975 A | * | 7/1967 | Osterwalder ................. | 310/164 |
| 3,469,133 A | * | 9/1969 | Stcherbatcheff ............. | 310/164 |
| 3,469,134 A | * | 9/1969 | Bering et al. ................ | 310/164 |
| 3,539,845 A | * | 11/1970 | Stcherbatcheff ............. | 310/46 |
| 3,610,980 A | * | 10/1971 | Astic et al. .................. | 310/172 |
| 3,614,495 A | * | 10/1971 | Suzuki et al. ............... | 310/162 |
| 3,678,311 A | * | 7/1972 | Mattingly .............. | 310/156.32 |
| 3,700,942 A | * | 10/1972 | Alth ........................... | 310/164 |
| 3,784,850 A | * | 1/1974 | Inaba et al. ................ | 310/49 R |
| 3,989,967 A | * | 11/1976 | Kikuyama et al. ......... | 310/112 |
| 4,336,471 A | * | 6/1982 | Plancon .................... | 310/49 R |
| 4,340,828 A | * | 7/1982 | Sudler et al. .............. | 310/49 R |
| 4,680,494 A | * | 7/1987 | Grosjean ............... | 310/156.35 |
| 5,384,506 A | | 1/1995 | Aoshima ................... | 310/49 R |
| 5,917,257 A | * | 6/1999 | Taghezout ................ | 310/49 R |
| 5,925,945 A | | 7/1999 | Aoshima .................. | 310/49 R |
| 5,945,753 A | | 8/1999 | Maegawa et al. ......... | 310/68 B |
| 5,969,453 A | | 10/1999 | Aoshima ................... | 310/156 |
| 5,973,425 A | | 10/1999 | Aoshima .................. | 310/49 R |
| 6,046,517 A | | 4/2000 | Sasaki et al. ......... | 310/40 MM |
| 6,081,053 A | | 6/2000 | Maegawa et al. ......... | 310/49 R |
| 6,157,107 A | | 12/2000 | Aoshima et al. ............ | 310/156 |
| 6,172,440 B1 | | 1/2001 | Sasaki et al. ............... | 310/156 |

(Continued)

FOREIGN PATENT DOCUMENTS

| | | | | | |
|---|---|---|---|---|---|
| CH | 604419 A | * | 9/1978 | ......... | H02K/37/00 |
| DE | 4417297 A1 | * | 11/1995 | ......... | H02K/37/12 |
| EP | 697762 A1 | * | 2/1996 | ......... | H02K/37/12 |
| GB | 2032705 A | * | 5/1980 | ......... | H02K/37/00 |
| JP | 03230745 A | * | 10/1991 | ......... | H02K/37/12 |
| JP | 7-213041 | | 8/1995 | ......... | H02K/29/00 |
| JP | 2000-50601 | | 2/2000 | ......... | H02K/29/00 |

*Primary Examiner*—Burton Mullins
(74) *Attorney, Agent, or Firm*—Fitzpatrick, Cella, Harper & Scinto

(57) ABSTRACT

A motor includes a magnet formed into a hollow disc shape and having at least one flat surface circumferentially divided and alternately magnetized to opposite poles, a first coil having an inner peripheral surface opposing the outer peripheral surface of the magnet, a second coil having an outer peripheral surface opposing the inner peripheral surface of the magnet, first magnetic pole portions opposing one flat surface of the magnet, formed from a plurality of teeth extending in the radial direction of the magnet, and excited by the first coil, second magnetic pole portions formed on the opposite side to the first magnetic pole portions via the magnet at positions opposing the first magnetic pole portions, third magnetic pole portions opposing one flat surface of the magnet, formed from a plurality of teeth extending in the radial direction of the magnet, and excited by the second coil, and fourth magnetic pole portions formed on the opposite side to the third magnetic pole portions via the magnet at positions opposing the third magnetic pole portions.

11 Claims, 13 Drawing Sheets

U.S. PATENT DOCUMENTS 6,255,749 B1    7/2001   Aoshima et al. .......... 310/49 R
6,316,851 B1   11/2001   Maegawa et al. ......... 310/49 R
6,400,055 B1    6/2002   Aoshima et al. ....... 310/156.01
6,411,003 B1    6/2002   Sasaki et al. .......... 310/156.02
6,465,916 B1   10/2002   Aoshima .................. 310/49 R

* cited by examiner

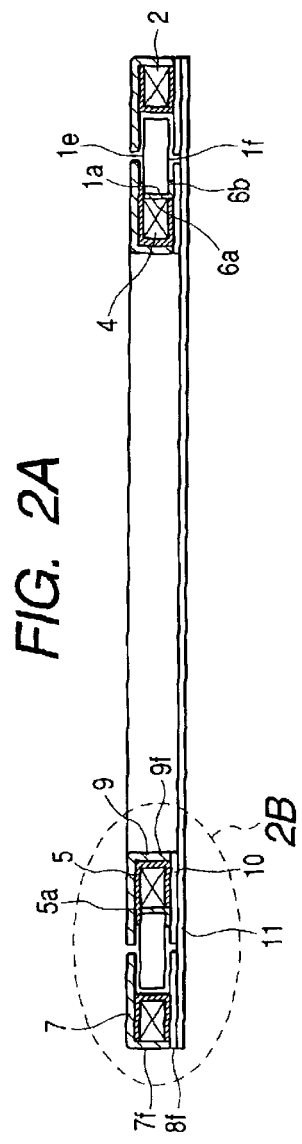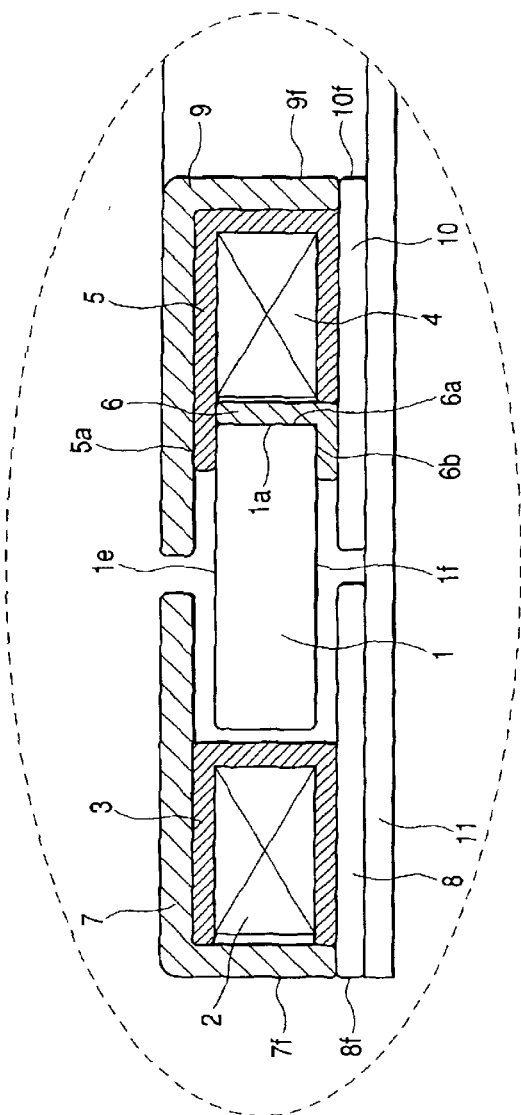

MOTOR

BACKGROUND OF THE INVENTION

1. Field of the Invention

The present invention relates to a flat motor which is thin in the direction of rotating shaft of the rotor.

2. Related Background Art

Brushless motors are suitable for small motors. The brushless motors include a stepping motor of a type shown in FIG. 18.

In this motor, a coil 105 is wound on each of two bobbins 101. The two bobbins 101 are fixed to two stator yokes 106, respectively. In each stator yoke 106, stator teeth 106a and 106b are alternately arranged inside the bobbin 101. Each stator yoke 106 integrated with the stator teeth 106a or 106b is fixed in a case 103 to form a stator 102. A flange 115 and bearing 108 are fixed to one of the two cases 103. Another bearing 108 is fixed to the other case 103. A rotor 109 is formed from a rotor magnet 111 fixed around a rotor shaft 110. The rotor shaft 110 is rotatably supported between the two bearings 108.

In the motor of the type shown in FIG. 18, however, two bobbins are arranged in the direction of rotating shaft of the rotor. In the radial direction of the rotors, the stators and coils are arranged outside the rotors. These impose limitations on size reduction if the performance of the motor is not to be degraded. In addition, most magnetic fluxes generated upon energizing the stator coils 105 pass between an end face 106a1 of the stator tooth 106a and an end face 106b1 of the stator tooth 106b while a few magnetic fluxes pass through the rotor magnet 111, as shown in FIG. 19.

A motor is used as the driving source of a shutter or stop adjustment mechanism in a silver halide camera or digital camera. To shorten the photographing optical system, the shutter and stop adjustment mechanism are arranged before and after the photographing lens. If the shutter or stop adjustment mechanism itself can be shortened, the photographing optical system can be made shorter.

A small device such as a cell phone has a pager motor. Such a pager motor converts the rotation of the motor into vibration by attaching a weight whose mass is unbalanced with respect to the center of rotation to the output shaft of the motor. The more the weight size increases, the larger the vibration generated by the pager motor becomes. Hence, if the diameter of the motor is too small, the area of the weight also decreases, and the vibration generated by the motor becomes small.

Japanese Patent Laid-Open Application No. 7-213041 or 2000-50601 proposes a flat motor whose size is reduced in the direction of rotating shaft of the rotor.

FIGS. 20 and 21 show this motor. The motor is formed from a plurality of coils 301, 302, and 303 and a disc-shaped magnet 304. Each coil has a thin coin shape, as shown in FIGS. 20 and 21. The shafts of the coils are parallel to the shaft of the magnet. The disc-shaped magnet is magnetized in its axial direction. The magnetized surface of the magnet opposes the shafts of the coils. The magnet 304 is rotated by sequentially energizing the plurality of coils 301 to 303 and thus generating magnetic fluxes. Since both the coils 301 to 303 and the magnet 304 are thin, the size of the motor can be reduced in the direction of rotating shaft. Since the motor is flat, it can be stored in a small device without decreasing the rotor size in the direction of diameter. The weight can also ensure an area corresponding to the diameter of the motor.

In the motor proposed in Japanese Patent Laid-Open Application No. 7-213041 or 2000-50601, however, the magnetic fluxes generated by each coil do not always effectively act on the magnet 304, as shown in FIG. 21. Although the motor has not so small size as a whole, the torque is not large. For this reason, it is difficult to construct a motor capable of obtaining a large torque especially for a small device.

SUMMARY OF THE INVENTION

The present invention has been made in consideration of the above situation, and has as its object to provide a motor capable of reducing the motor size in the direction of rotating shaft and obtaining a large torque.

According to an aspect of the present invention, there is provided a motor comprising a rotor having at least one flat surface divided in a rotational direction and alternately magnetized to opposite poles, a first coil having an inner peripheral surface opposing an outer peripheral surface of the rotor, a second coil having an outer peripheral surface opposing an inner peripheral surface of the rotor, first magnetic pole portions opposing the one flat surface of the rotor, formed from a plurality of teeth extending in a radial direction of the rotor, and excited by the first coil, second magnetic pole portions formed on an opposite side to the first magnetic pole portions via the rotor at positions opposing the first magnetic pole portions, third magnetic pole portions opposing the one flat surface of the rotor, formed from a plurality of teeth extending in the radial direction of the rotor, and excited by the second coil, and fourth magnetic pole portions formed on an opposite side to the third magnetic pole portions via the rotor at positions opposing the third magnetic pole portions.

The second and fourth magnetic pole portions may be integrally formed from one member.

According to another aspect of the present invention, there is provided a motor comprising a rotor having at least one flat surface divided in a rotational direction and alternately magnetized to opposite poles, a coil opposing one of an inner peripheral surface and an outer peripheral surface of the rotor, first magnetic pole portions opposing the one flat surface of the rotor, formed from a plurality of teeth extending in a radial direction of the rotor, and excited by the coil, second magnetic pole portions formed on an opposite side to the first magnetic pole portions via the rotor at positions opposing the first magnetic pole portions, and alignment portions which hold a center of a pole of the rotor to a position shifted from a line which connects a center of the first magnetic pole portions and a center of rotation of the rotor when the coil is not energized.

The alignment portions are preferably formed from a plurality of teeth extending in the radial direction of the rotor to be flush with the first magnetic pole portions.

When the coil is arranged on the outer peripheral side of the rotor, and a weight having an unbalanced mass is fixed on the inner peripheral side of the rotor, a pager motor can be formed.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 2A and 2B are sectional views of the stepping motor shown in FIG. 1 in the axial direction in an assembled state;

DETAILED DESCRIPTION OF THE PREFERRED EMBODIMENTS

The embodiments of the present invention will be described below in detail with reference to the accompanying drawings.

Figure 1:
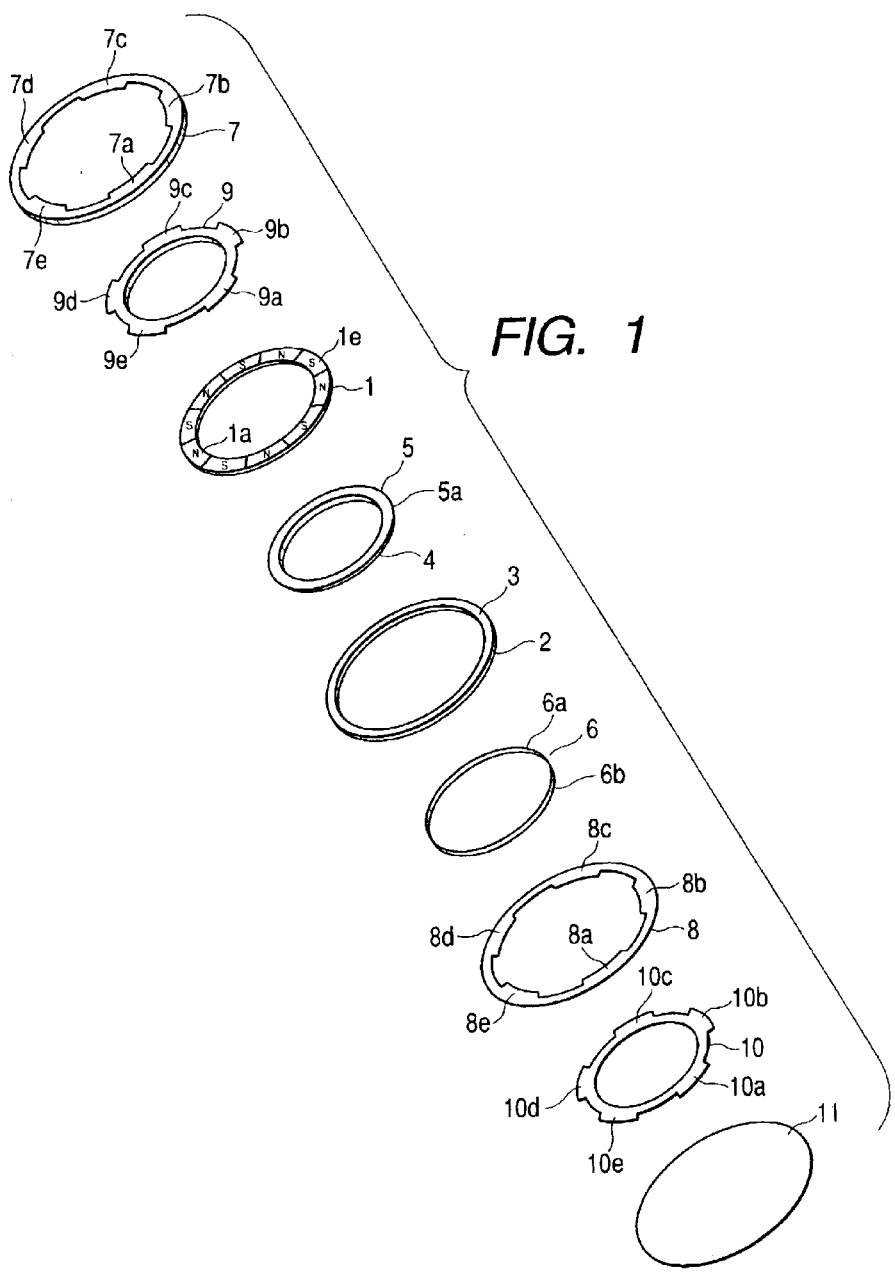
FIG. 1 is an exploded perspective view of a stepping motor according to an embodiment of the present invention.

FIGS. 1 to 6 are views showing a motor according to an embodiment of the present invention. FIG. 1 is an exploded perspective view of the motor. FIG. 2A is a sectional view of a shutter in the axial direction in an assembled state. FIG. 2B is an enlarged view of main part shown in FIG. 2A. FIGS. 3, 4, 5, and 6 are views showing the positional relationship between a stator and a magnet serving as a rotor when the rotor is rotated.

Figure 3:
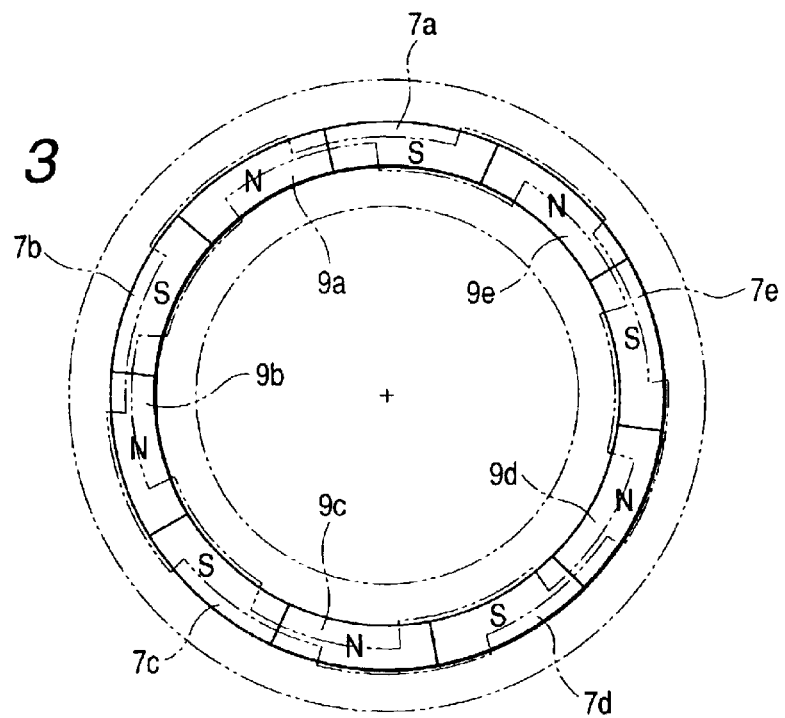
FIG. 3 is a view for explaining the rotating operation of the magnet of the stepping motor shown in FIG. 1.

Referring to FIGS. 1 to 5, a magnet 1 is formed as a rotor. The magnet 1 has a hollow disc shape (ring shape) and is held rotatably regarding the center of the ring as a rotational axis. This magnet has two surfaces 1e and 1f to which the rotational axis of the motor extends as a normal and which oppose each other, an inner peripheral surface, and an outer peripheral surface. At least one of the two surfaces 1e and 1f opposing each other is divided into a plurality of parts in a rotational direction about the rotational axis. These divided parts are alternately magnetized to opposite poles. In this embodiment, the surface 1e of the magnet 1 is divided into 10 parts in the rotational direction, which are alternately magnetized to the S and N poles, as shown in FIG. 3. Preferably, the other surface 1f of the magnet 1 is also divided into 10 parts in a rotational direction, which are magnetized to poles opposite to those on the surface 1e, though the parts may be unmagnetized at all. Alternatively, only the surface 1f of the magnet 1 may be magnetized, and the surface 1e may be unmagnetized. However, when both the surfaces 1e and 1f are magnetized, the rotational torque of the motor becomes large.

The magnet 1 is formed by injection-molding a plastic magnet. Since a magnet formed by injection molding has a thin resin coating on its surface, it hardly rusts as compared to a magnet formed by compression molding. For this reason, the corrosion prevention process such as coating can be omitted. In addition, a magnetic powder hardly sticks to a magnet formed by injection molding, though the powder poses a problem for a magnet formed by compression molding.

As the material of the magnet 1, a mixture containing an Nd—Fe—B-based rare earth magnetic powder and a thermoplastic resin binder material such as polyamide is used. The bending strength of a magnet formed by compression molding was 500 Kgf/cm$^2$. The bending strength of a magnet formed by injection molding using a polyamide resin as a binder material was 800 Kgf/cm$^2$. When a magnet is formed by injection molding, a high bending strength can be obtained. Hence, a thinner magnet can be formed. When a magnet is thin, the interval between two stators that oppose each other via the magnet can be reduced, and the reluctance between the stators can be reduced. Accordingly, when coils are energized, many magnetic fluxes can be generated even by a small magnetomotive force, and the motor driving force can be increased.

A first coil 2 has a cylindrical shape and is wound on a first bobbin 3 made of an insulating material. The central position of the first coil 2 matches that of the magnet 1. In addition, the first coil 2 is arranged while making its inner peripheral surface face the outer peripheral surface of the magnet 1. Furthermore, the magnet 1 and first coil 2 almost have the same length in the direction of rotational axis of the magnet 1. That is, the magnet 1 and first coil 2 are arranged on the same plane perpendicular to the rotational axis and at the same position in the direction of rotational axis.

A second coil 4 has a cylindrical shape and is wound on a second bobbin 5 made of an insulating material. The central position of the second coil 4 matches that of the magnet 1. In addition, the second coil 4 is arranged while making its outer peripheral surface face the inner peripheral surface of the magnet 1. Furthermore, the magnet 1 and second coil 4 almost have the same length in the direction of rotational axis of the magnet 1. That is, the magnet 1 and second coil 4 are arranged on the same plane perpendicular to the rotational axis and at the same position in the direction of rotational axis.

A rib 5a of the bobbin 5 holds the distance between the surface 1e of the magnet 1 and each magnetic pole portion of a stator 9 and also the distance between the surface 1e and each magnetic pole portion of a stator 7.

A ring 6 is fixed to a fourth stator 10 (to be described later). An inner peripheral surface 1a of the magnet 1 is fitted on a sliding surface 6a on the outer periphery. A rib 6b of the ring 6 holds the distance between the surface 1f of the magnet 1 and each magnetic pole portion of the stator 10 and also the distance between the surface 1f and each magnetic pole portion of a stator 8.

The first stator 7 is made of a soft magnetic material and has first magnetic pole portions 7a, 7b, 7c, 7d, and 7e which are excited by energizing the first coil 2. The first magnetic pole portions 7a to 7e oppose the surface 1e of the magnet 1 via a predetermined gap. The first magnetic pole portions 7a to 7e are formed into comb teeth extending in the radial direction of the magnet 1. When the number of divided poles of the magnet 1 is "n" (n=10 in this embodiment), the number of comb teeth is n/2. When the first coil 2 is energized, all the first magnetic pole portions 7a to 7e are excited to the same pole.

The first magnetic pole portions 7a to 7e are divisionally formed at an equal angular interval of 720/n degrees in the rotational direction. When the first magnetic pole portions have this structure, the motor can be made thinner. If the magnetic pole portions are formed into a three-dimensional pattern extending in the direction of rotational axis of the magnet, the stator becomes thick in correspondence with the difference between the recessed portions and the projecting portions. However, when the magnetic pole portions are formed into a comb-tooth shape extending in the radial direction of the magnet 1, a stator having no thickness corresponding to the difference can be formed.

The second stator 8 is made of a soft magnetic material and has second magnetic pole portions 8a, 8b, 8c, 8d, and 8e which are excited by energizing the first coil 2. The second magnetic pole portions 8a to 8e oppose the surface 1f of the magnet 1 via a predetermined gap. The second magnetic pole portions 8a to 8e are formed into comb teeth extending in the radial direction of the magnet 1. When the number of divided poles of the magnet 1 is "n" (n=10 in this embodiment), the number of comb teeth is n/2.

The second magnetic pole portions 8a to 8e of the second stator are formed at positions opposing the first magnetic pole portions 7a to 7e of the first stator 7 via the magnet 1. The first and second stators are magnetically connected at positions on the opposite sides to their magnetic pole portions, i.e., at portions 7f and 8f that cover the outer periphery of the first coil 2. That is, the first coil 2, first stator 7, and second stator 8 constitute a magnetic circuit. When the first coil 2 is energized, all the second magnetic pole portions 8a to 8e are excited to the same pole. The second magnetic pole portions 8a to 8e are excited to the pole opposite to that of the first magnetic pole portions 7a to 7e.

The second magnetic pole portions 8a to 8e are also divisionally formed at an equal angular interval of 720/n degrees in the rotational direction. The second magnetic pole portions having the comb-tooth shape extending in the radial direction of the magnet 1 can also make the motor thin, like the first magnetic pole portions.

The third stator 9 is made of a soft magnetic material and has third magnetic pole portions 9a, 9b, 9c, 9d, and 9e which are excited by energizing the second coil 4. The third magnetic pole portions 9a to 9e oppose the surface 1e of the magnet 1 via a predetermined gap. The third magnetic pole portions 9a to 9e are formed into comb teeth extending in the radial direction of the magnet 1. When the number of divided poles of the magnet 1 is "n" (n=10 in this embodiment), the number of comb teeth is n/2. When the second coil 4 is energized, all the third magnetic pole portions 9a to 9e are excited to the same pole.

The third magnetic pole portions 9a to 9e are also divisionally formed at an equal angular interval of 720/n degrees in the rotational direction. The third magnetic pole portions having the comb-tooth shape extending in the radial direction of the magnet 1 can also make the motor thin, like the first magnetic pole portions.

The fourth stator 10 is made of a soft magnetic material and has fourth magnetic pole portions 10a, 10b, 10c, 10d, and 10e which are excited by energizing the second coil 4. The fourth magnetic pole portions 10a to 10e oppose the surface 1f of the magnet 1 via a predetermined gap. The fourth magnetic pole portions 10a to 10e are formed into comb teeth extending in the radial direction of the magnet 1. When the number of divided poles of the magnet 1 is "n" (n=10 in this embodiment), the number of comb teeth is n/2.

The fourth magnetic pole portions 10a to 10e of the fourth stator are formed at positions opposing the third magnetic pole portions 9a to 9e of the third stator 9 via the magnet 1. The third and fourth stators are magnetically connected at positions on the opposite sides to their magnetic pole portions, i.e., at portions 9f and 10f that cover the inner periphery of the second coil 4. That is, second coil 4, third stator 9, and fourth stator 10 constitute a magnetic circuit. When the second coil 4 is energized, all the fourth magnetic pole portions 10a to 10e are excited to the same pole. The fourth magnetic pole portions 10a to 10e are excited to the pole opposite to that of the third magnetic pole portions 9a to 9e.

The fourth magnetic pole portions 10a to 10e are also divisionally formed at an equal angular interval of 720/n degrees in the rotational direction. The fourth magnetic pole portions having the comb-tooth shape extending in the radial direction of the magnet 1 can also make the motor thin, like the first magnetic pole portions.

The value of the rotational torque of this motor can be represented by the product of an electromagnetic force generated upon exciting the magnetic pole portions and the distance from the point of action of the electromagnetic force to the center of the magnet 1. The position where the first magnetic pole portions 7a to 7e oppose the surface 1e of the magnet 1 is outside the position where third magnetic pole portions 9a to 9e oppose the surface 1e. That is, the distance from the point of action of the electromagnetic force is larger for the first magnetic pole portions than for the third magnetic pole portions. To make the rotational torque of the motor by the first magnetic pole portions equal to that by the third magnetic pole portions, the electromagnetic force generated when the third magnetic pole portions are excited is made larger than that generated when the first magnetic pole portions are excited. To do this, the area of the third magnetic pole portions opposing the surface 1e of the magnet 1 is made larger than the area of the first magnetic pole portions opposing the surface 1e of the magnet 1. When this area is appropriately adjusted, the rotational torque of the motor by the first magnetic pole portions equals that by the third magnetic pole portions. Hence, a stepping motor having good positioning performance can be formed.

In this embodiment wherein the number of divided poles of the magnet 1 is "n", the phase of the first magnetic pole portions opposing the surface 1e of the magnet 1 shifts from the phase of the third magnetic pole portions opposing the surface 1e by 180/n degrees, i.e. 18 degrees.

A base 11 is made of a nonmagnetic material and fixes the second stator 8 and fourth stator 10. The second stator 8 and fourth stator 10 are separately fixed and not magnetically connected.

As described above, in the motor of this embodiment, the first magnetic pole portions 7a to 7e and second magnetic pole portions 8a to 8e are formed to sandwich the magnetized surfaces 1e and 1f of the magnet 1 via a predetermined gap. Magnetic fluxes generated when the first coil 2 is energized cross the magnet 1 that is sandwiched between the first magnetic pole portions 7a to 7e and the second magnetic pole portions 8a to 8e. Hence, the magnetic fluxes effectively act on the magnet 1 serving as a rotor and increase the output of the rotor. This also applies to the third magnetic pole portions 9a to 9e and fourth magnetic pole portions 10a to 10e. In addition, since the magnet 1 can be made very short in the direction of rotational axis of the magnet 1, i.e., the magnet 1 can be made very thin, the interval between the first magnetic pole portions 7a to 7a and the second magnetic pole portions 8a to 8e or the interval between the third magnetic pole portions 9a to 9e and the fourth magnetic pole portions 10a to 10e can greatly be decreased. For this reason, the reluctance of the magnetic circuit formed from the first coil 2, first magnetic pole portions 7a to 7e, and second magnetic pole portions 8a to 8e can be reduced. Similarly, the reluctance of the-magnetic circuit formed from the second coil 4, third magnetic pole portions 9a to 9e, and fourth magnetic pole portions 10a to 10e can be reduced. Accordingly, many magnetic fluxes can be generated by a small current. An increase in output of the rotor, reduction of power consumption, and size reduction of the motor can be achieved.

The operation of the stepping motor according to this embodiment described with reference to FIGS. 1, 2A, and 2B will be described next with reference to FIGS. 3 to 6.

FIG. 3 shows a state wherein the first coil 2 and second coil 4 are energized to excite the first magnetic pole portions 7a to 7e of the first stator 7 to the N pole, the second magnetic pole portions 8a to 8e of the second stator 8 to the S pole, the third magnetic pole portions 9a to 9e of the third stator 9 to the S pole, and the fourth magnetic pole portions 10a to 10e of the fourth stator 10 to the N pole.

Figure 4:
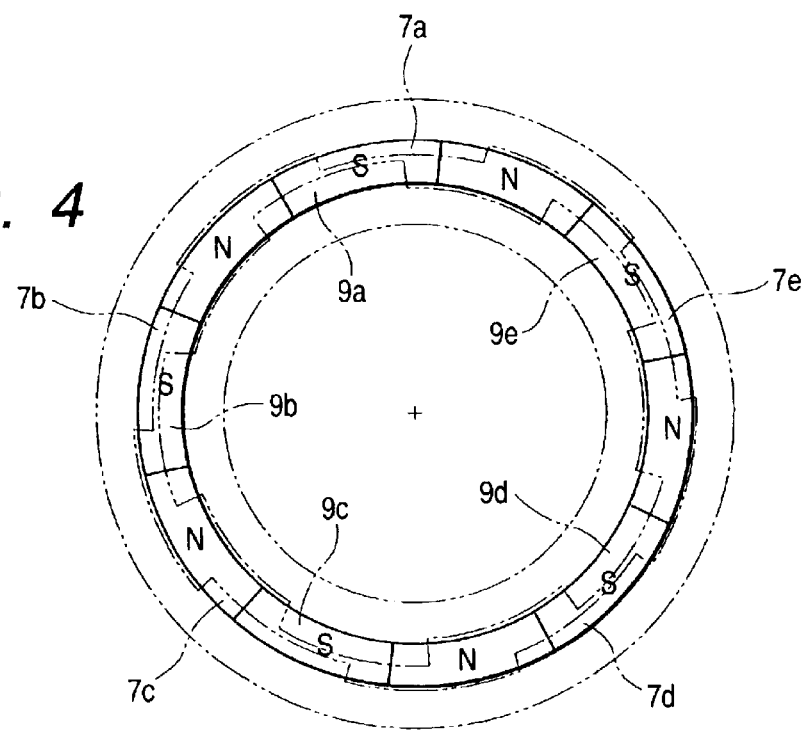
FIG. 4 is a view for explaining the rotating operation of the magnet of the stepping motor shown in FIG. 1.

In the state shown in FIG. 3, the direction of energization to the second coil 4 is switched to excite the third magnetic pole portions 9a to 9e of the third stator 9 to the N pole and the fourth magnetic pole portions 10a to 10e of the fourth stator 10 to the S pole while keeping the direction of energization to the first coil 2 unchanged. The magnet 1 rotates by 18 degrees counterclockwise, and the state shown in FIG. 4 is obtained.

Figure 5:
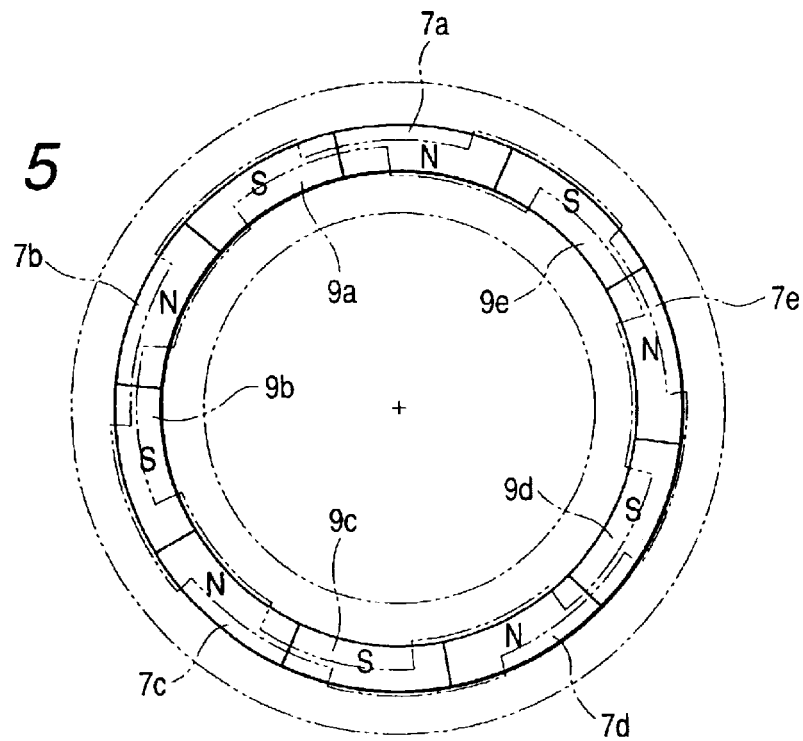
FIG. 5 is a view for explaining the rotating operation of the magnet of the stepping motor shown in FIG. 1.

Next, the energization to the first coil 2 is inverted to excite the first magnetic pole portions 7a to 7e of the first stator 7 to the S pole and the second magnetic pole portions 8a to 8e of the second stator 8 to the N pole. The magnet 1 further rotates by 18 degrees counterclockwise, and the state shown in FIG. 5 is obtained.

Figure 6:
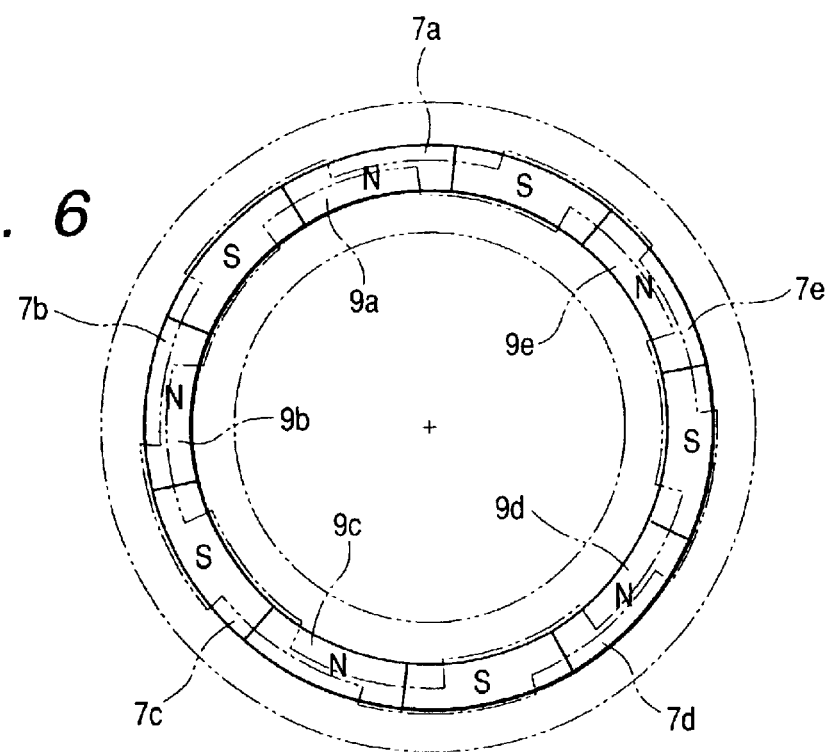
FIG. 6 is a view for explaining the rotating operation of the magnet of the stepping motor shown in FIG. 1.

Then, the energization to the second coil 4 is inverted to excite the third magnetic pole portions 9a to 9e of the third stator 9 to the S pole and the fourth magnetic pole portions 10a to 10e of the fourth stator 10 to the N pole. The magnet 1 further rotates by 18 degrees counterclockwise, and the state shown in FIG. 6 is obtained.

When the directions of energization to the first coil 2 and second coil 4 are sequentially switched in the above way, the magnet 1 rotates to a position corresponding to the energization phase.

Note that when an opening portion is formed at the center of the base 11 and connected to the magnet 1 to open/close a shutter vane (not shown), a shutter unit for controlling the amount of light passing through the opening portion of the base 11 can be formed.

Figure 7:
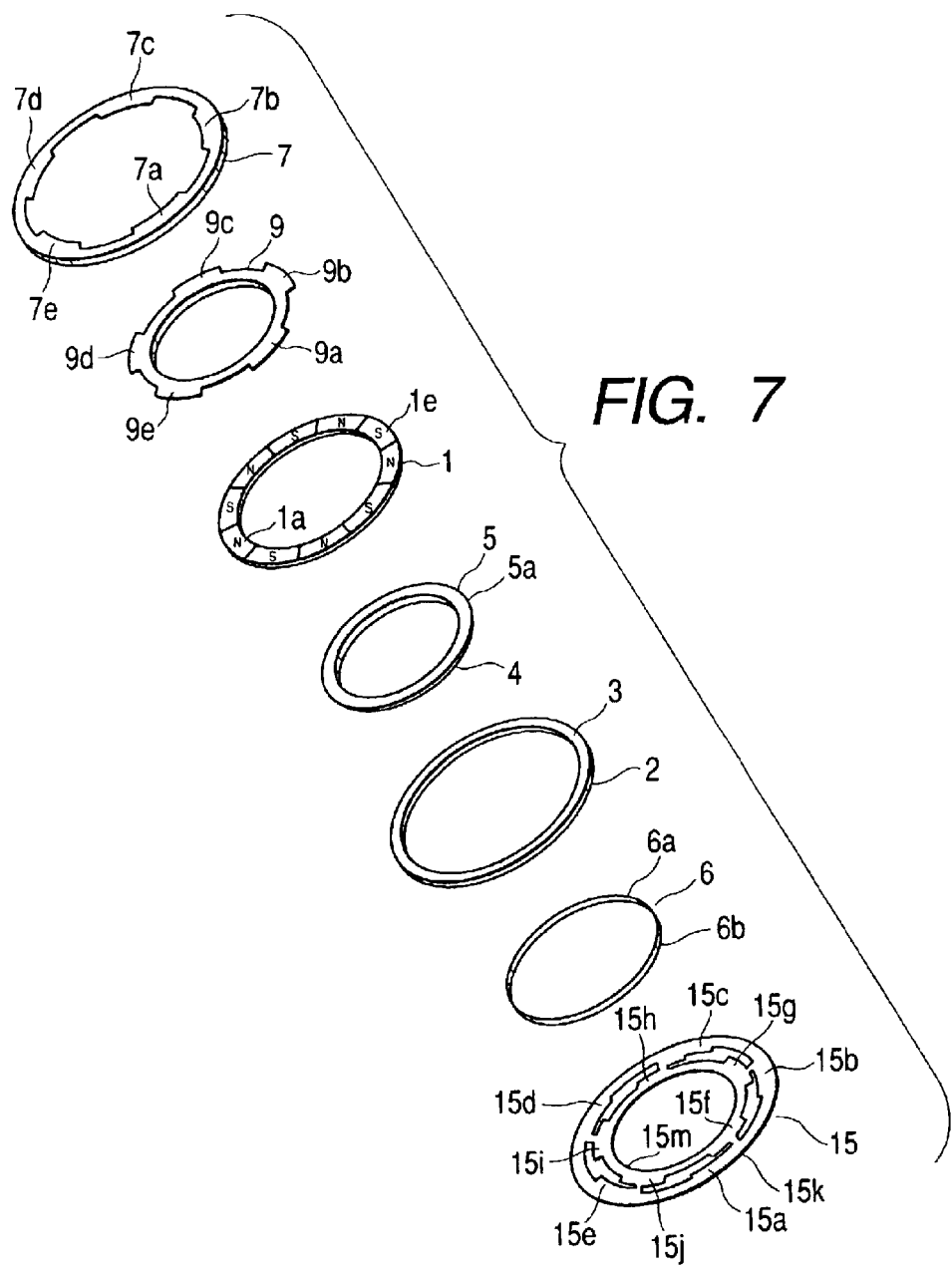
FIG. 7 is an exploded perspective view of a stepping motor according to another embodiment of the present invention.

FIG. 7 is a view showing another embodiment of the present invention. A base 11 is omitted, and the second and fourth stators of the motor shown in FIG. 1 are formed from a single member. A fifth stator 15 is made of a soft magnetic material. Slits are formed in a disc to form second magnetic pole portions 15a, 15b, 15c, 15d, and 15e and fourth magnetic pole portions 15f, 15g, 15h, 15i, and 15j. The second magnetic pole portions 15a to 15e and fourth magnetic pole portions 15f to 15j also have comb-tooth shapes extending in the radial direction of a magnet 1, which can further make the motor thin, like the third stator and fourth stator shown in FIG. 1.

The second magnetic pole portions 15a to 15e of the fifth stator 15 are formed at positions opposing first magnetic pole portions 7a to 7e of a first stator 7 via the magnet 1. The fourth magnetic pole portions 15f to 15j are formed at positions opposing third magnetic pole portions 9a to 9e of a third stator 9 via the magnet 1. The first stator 7 and fifth stator 15 are magnetically connected at positions on the opposite sides to their magnetic pole portions, i.e., at portions 7f and 15k that cover the outer periphery of the first coil 2. In addition, the third stator 9 and fifth stator 15 are magnetically connected at positions on the opposite sides to their magnetic pole portions, i.e., at portions 9f and 15m that cover the inner periphery of the second coil 4.

To reduce passage of magnetic fluxes between the second magnetic pole portions 15a to 15e and the fourth magnetic pole portions 15f to 15j of the fifth stator 15 as much as possible, the connection portions between the second magnetic pole portions 15a to 15e and the fourth magnetic pole portions 15f to 15j are made as thin as possible to increase the reluctance therebetween.

According to the motor shown in FIG. 7, since the base 11 that is used in the motor shown in FIG. 1 can be omitted, a thinner stepping motor can be formed. In addition, since the second and fourth magnetic pole portions are integrally formed, the phase between them does not shift in assembly. Hence, assembly is facilitated.

Figure 8:
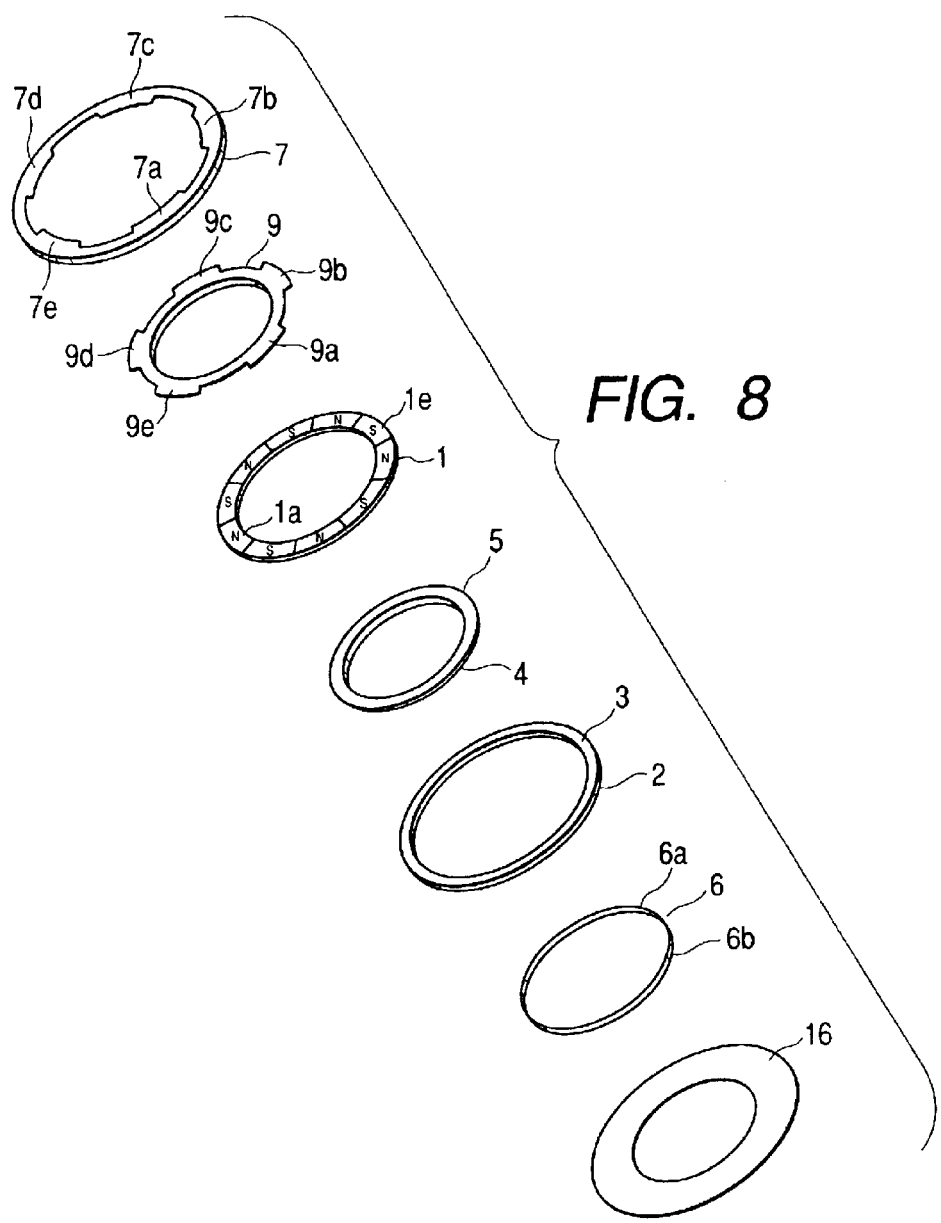
FIG. 8 is an exploded perspective view of a stepping motor according to still another embodiment of the present invention.

FIG. 8 is a view showing still another embodiment of the present invention. A base 11 is omitted, and the second and fourth stators of the motor shown in FIG. 1 are formed from a single member. In addition, unlike the motor shown in FIG. 7, the second and fourth magnetic pole portions are formed not as comb teeth extending in the radial direction but as a stator having a simple flat plate shape. A sixth stator 16 is made of a soft magnetic material.

First magnetic pole portions 7a to 7e of a first stator 7 are formed into a comb-tooth shape. Magnetic fluxes flowing from the first magnetic pole portions 7a to 7e pass between the first magnetic pole portions 7a to 7e and the projection positions of the shapes of the first magnetic pole portions 7a to 7e onto the flat plate of the sixth stator 16. Hence, the sixth stator 16 opposing the first magnetic pole portions 7a to 7e can have a simple flat plate shape without any problem.

Similarly, third magnetic pole portions 9a to 9e of a third stator 9 are formed into a comb-tooth shape. Magnetic fluxes flowing from the third magnetic pole portions 9a to 9e pass between the third magnetic pole portions 9a to 9e and the projection positions of the shapes of the third magnetic pole portions 9a to 9e onto the flat plate of the sixth stator 16. Hence, the sixth stator 16 opposing the third magnetic pole portions 9a to 9e can have a simple flat plate shape without any problem.

However, since the magnetic circuit including a first coil 2 and that including a second coil 4 are magnetically coupled, the magnetic circuits readily influence each other. Although the positioning accuracy is slightly lower than that of the motors shown in FIGS. 1 to 7 due to the above reason, the shape can be simplified as compared to the motors shown in FIGS. 1 to 7. Hence, a motor easy to manufacture can be formed.

Figure 9:
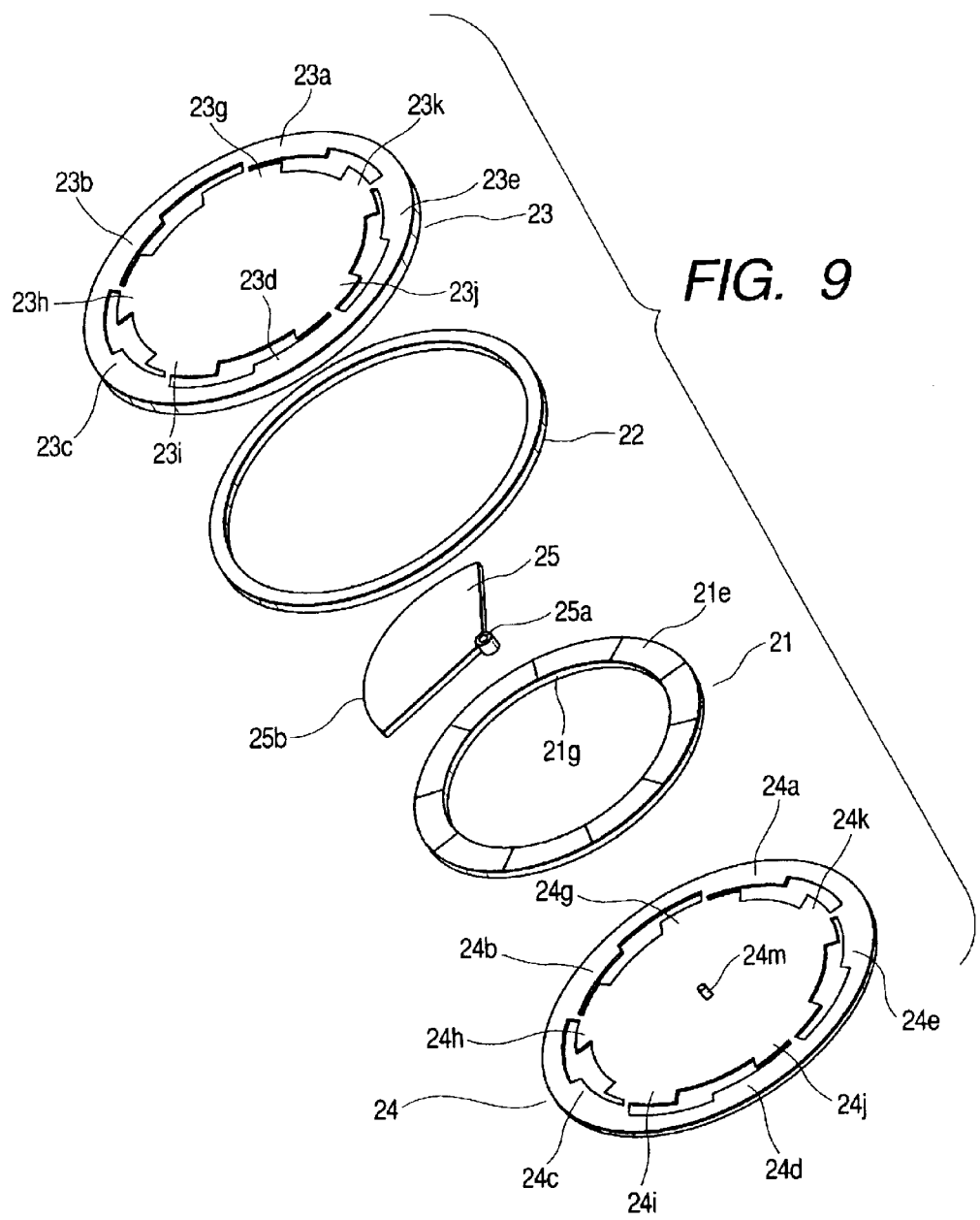
FIG. 9 is an exploded perspective view of a pager motor according to still another embodiment of the present invention.
Figure 10:
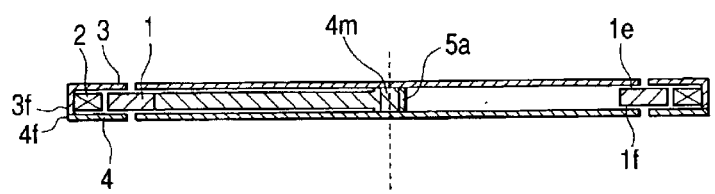
FIG. 10 is a sectional view of the pager motor shown in FIG. 9 in the axial direction in an assembled state.
Figure 11:
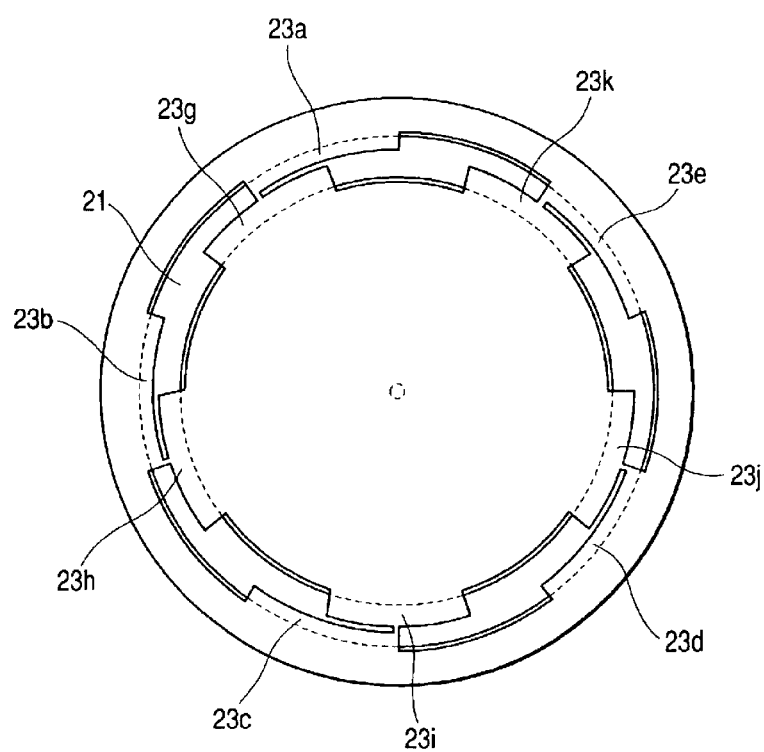
FIG. 11 is a plan view of the stator of the pager motor shown in FIG. 9.

FIGS. 9 to 15 are views showing a motor according to still another embodiment of the present invention. FIG. 9 is an exploded perspective view of the motor. FIG. 10 is a sectional view of the motor in the axial direction in an assembled state. FIG. 11 is a plan view of a first stator (to be described later). FIGS. 12, 13, 14, and 15 are views showing the positional relationship between a magnet and the stator when the magnet is rotated.

Referring to FIGS. 9 to 15, a magnet 21 serving as a rotor has the same structure as that of the magnet 1 shown in FIGS. 1 to 8.

A coil 22 has a cylindrical shape and is wound on a bobbin made of an insulating material. The central position of the coil 22 matches that of the magnet 21. In addition, the coil 22 is arranged while making its inner peripheral surface oppose the outer peripheral surface of the magnet 21. Furthermore, the magnet 21 and coil 22 almost have the same length in the direction of rotational axis of the magnet 21. That is, the magnet 21 and coil 22 are arranged on the same plane perpendicular to the rotational axis and at the same position in the direction of rotational axis.

A first stator 23 is made of a soft magnetic material and has first magnetic pole portions 23a, 23b, 23c, 23d, and 23e which are excited by energizing the coil 22. The first magnetic pole portions 23a to 23e oppose a surface 21e of the magnet 21 via a predetermined gap. The first magnetic pole portions 23a to 23e are formed into comb teeth extending in the radial direction of the magnet 21. When the number of divided poles of the magnet 21 is "n" (n=10 in this embodiment), the number of comb teeth is n/2. When the coil is energized, all the first magnetic pole portions 23a to 23e are excited to the same pole.

The first magnetic pole portions 23a to 23e are divisionally formed at an equal angular interval of 720/n degrees in the rotational direction. When the first magnetic pole portions have this structure, the motor can be made thinner. If the magnetic pole portions are formed into a three-dimensional pattern extending in the direction of rotational axis of the magnet, the stator becomes thick in correspondence with the difference between the recessed portions and the projecting portions. However, when the magnetic pole portions are formed into a comb-tooth shape extending in the radial direction of the magnet 21, a stator having no thickness corresponding to the difference can be formed.

As shown in FIG. 11, positioning stator portions 23g, 23h, 23i, 23j, and 23k are formed on the inner peripheral side of the first magnetic pole portions 23a to 23e such that the positioning stator portions 23g to 23k are flush with the first magnetic pole portions 23a to 23e. The positioning stator portions 23g to 23k are connected to and integrated with the first magnetic pole portions. The center of a circle that connects the first magnetic pole portions 23a to 23e matches the center of a circle that connects the positioning stator portions 23g to 23k.

The positioning stator portions 23g to 23k are arranged while having phase shifts from the central positions of the magnetic pole portions of the first magnetic pole portions 23a to 23e and oppose the surface 21e of the magnet 21 via a predetermined gap. The positioning stator portions 23g to 23k are also formed into comb teeth extending in the radial direction of the magnet 21. When the number of divided poles of the magnet 21 is "n" (n=10 in this embodiment), the number of extending comb teeth is n/2.

These positioning stator portions 23g to 23k are also divisionally formed at an equal angular interval of 720/n degrees in the rotational direction, like the first magnetic pole portions 23a to 23e.

A second stator 24 is made of a soft magnetic material and has second magnetic pole portions 24a, 24b, 24c, 24d, and 24e which are excited by energizing the coil 22. The second magnetic pole portions 24a to 24e oppose a surface 21f of the magnet 21 via a predetermined gap. The second magnetic pole portions 24a to 24e are formed into comb teeth extending in the radial direction of the magnet 21. The second stator 24 has the same shape as that of the first stator 23 except that a nib 24m is arranged at the central portion. The first magnetic pole portions 23a to 23e and second magnetic pole portions 24a to 24e are arranged while opposing each other via the magnet 21 such that the first and second magnetic pole portions have the same phase.

As shown in FIG. 10, the first stator 23 and second stator 24 are connected at positions on the opposite sides to their magnetic pole portions, i.e., at portions that cover the outer periphery of the coil 22. The coil 22, first stator 23, and second stator 24 constitute a magnetic circuit.

The first magnetic pole portions 23a to 23e and second magnetic pole portions 24a to 24e sandwich the magnetized surfaces 21e and 21f of the magnet 21 via a predetermined gap through a bearing portion 25a of a weight 25 fixed to the magnet 21. Magnetic fluxes generated when the coil 22 is energized cross the magnet 21 that is sandwiched between the first magnetic pole portions 23a to 23e and the second magnetic pole portions 24a to 24e. Hence, the magnetic fluxes effectively act on the magnet 21 serving as a rotor and increase the output of the rotor. In addition, since the magnet 21 can be made very short in the direction of rotational axis of the magnet 21, i.e., the magnet 21 can be made very thin, the interval between the first magnetic pole portions 23a to 23e and the second magnetic pole portions 24a to 24e can greatly be decreased. For this reason, the reluctance of the magnetic circuit formed from the coil 22, first magnetic pole portions 23a to 23e, and second magnetic pole portions 24a to 24e can be reduced. Accordingly, many magnetic fluxes can be generated by a small current. An increase in output of the rotor, reduction of power consumption, and size reduction of the coil can be achieved.

The weight 25 has the bearing portion 25a rotatably fitted on the nib 24m of the second stator 24. An outer peripheral portion 25b of the weight 25 and an inner peripheral portion 21g of the magnet 21 are adhered to each other. Accordingly, the magnet 21 rotates integrally with the weight 25 about the nib 24m.

The mass of the weight 25 is unbalanced with respect to the bearing portion 25a. Hence, when the weight 25 rotates together with the magnet 21, vibration is generated. In addition, the first stator 23 and second stator 24 cover the magnet 21 having a hollow disc shape and the weight 25, thereby preventing any other member from entering the rotation orbit of the weight 25. Since the weight 25 is arranged on the inner peripheral side of the magnet 21 having a hollow disc shape, the outer size of the motor does not increase due to the weight 25.

As is apparent from FIGS. 9. and 11, the first magnetic pole portions 23a to 23e and positioning stator portions 23g to 23*k* are connected in a one-to-one correspondence, through the connection portions are very thin. The thin connection portions have a very high reluctance. Hence, when the coil 22 is energized, all the first magnetic pole portions 23*a* to 23*e* are excited to the same pole while the positioning stator portions 23*g* to 23*k* are rarely excited. This also applies to the second stator 24 having the same shape as that of the first stator 23 except the nib 24*m*. The first magnetic pole portions 23*a* to 23*e* and second magnetic pole portions 24*a* to 24*e* are excited to opposite poles. Hence, when the coil 22 is energized, the magnet 21 is rotated to a position where the central portion of each of the first magnetic pole portions 23*a* to 23*e* opposes the central portion of the pole of the magnet 21 by magnetic fluxes generated between the first magnetic pole portions and the second magnetic pole portions.

The rotational position of the magnet 21 when the coil 22 is not energized will be described with reference to FIG. 12. Q1 is the central portion of the first magnetic pole portion 23*a*. Q3 is the center of rotation of the magnet 21, i.e., the center of the bearing portion 25*a*. As described above, the magnetic poles of the first magnetic pole portions 23*a* to 23*e* oppose those of the second magnetic pole portions 24*a* to 24*e*.

When the coil 22 is not energized, the magnet 21 is held at a position at which a central portion Q2 of the pole of the magnet 21 shifts from the line that connects the center Q1 of the magnetic pole portion of the first stator 23 to the center Q3 of rotation of the magnet 21 by the attraction that acts between the surface 21*e* of the magnet 21, the first magnetic pole portions 23*a* to 23*e*, and the positioning stator portions 23*g* to 23*k* and the attraction that acts between the surface 21*f* of the magnet 21, the second magnetic pole portions 24*a* to 24*e*, and positioning stator portions 24*g* to 24*k*. More specifically, the magnet 21 is held at a position where the central portion Q2 of the pole of the magnet 21 is rotated to the side of the positioning stator portion 23*g* connected to the first magnetic pole portion 23*a*.

In this state, when the coil 22 is energized, magnetic fluxes that are very strong as compared to the positioning stator portions 23*g* to 23*k* and 24*g* to 24*k* are generated in the first magnetic pole portions 23*a* to 23*e* and second magnetic pole portions 24*a* to 24*e*. Accordingly, the magnet 21 rotates to a position at which the central portion Q2 of the magnet 21 opposes the central portion of the first magnetic pole portions 23*a* to 23*e*.

Assume that no positioning stator portions are present. In this case, the magnet is held at a rotation position where the central portion Q2 of the pole of the magnet 21 opposes the central portion of the first magnetic pole portions 23*a* to 23*e* before energizing the coil 22. When the coil 22 is energized in this state, no smooth rotation activation can be executed because a strong holding force acts on the magnet 21 that is attracted by an opposite magnetic pole, or almost uniform attractions from the magnetic poles on both sides of the opposite magnetic pole act on the magnet 21.

The rotation operation of the motor according to this embodiment will be described next with reference to FIGS. 12 to 15.

Figure 12:
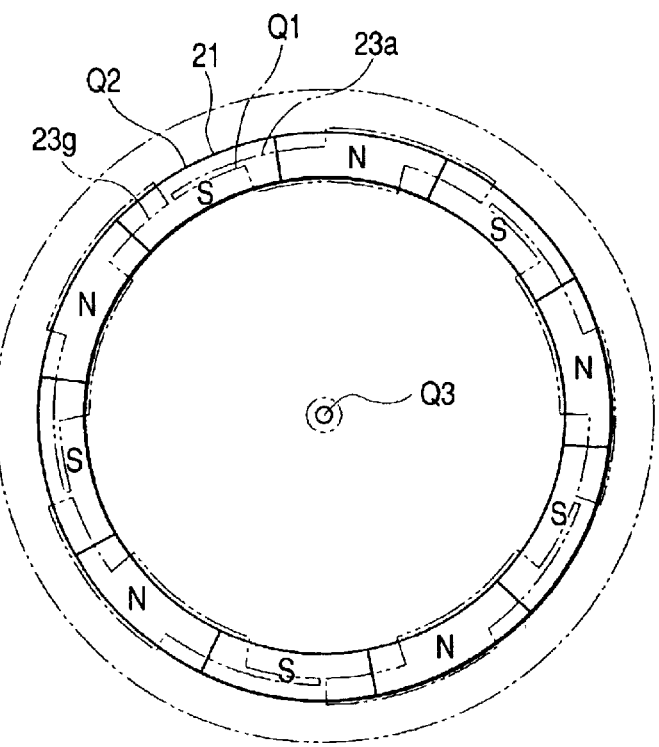
FIG. 12 is a view for explaining the rotating operation of the magnet of the motor shown in FIG. 9.
Figure 13:
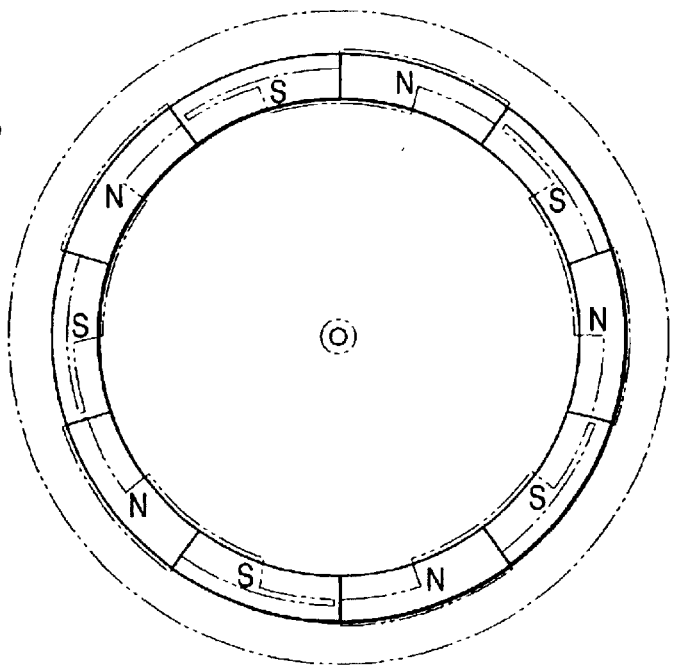
FIG. 13 is a view for explaining the rotating operation of the magnet of the motor shown in FIG. 9.
Figure 14:
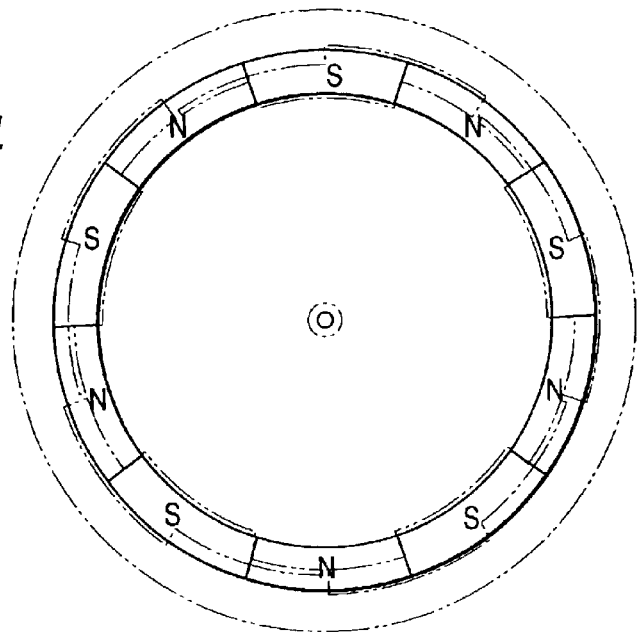
FIG. 14 is a view for explaining the rotating operation of the magnet of the motor shown in FIG. 9.
Figure 15:
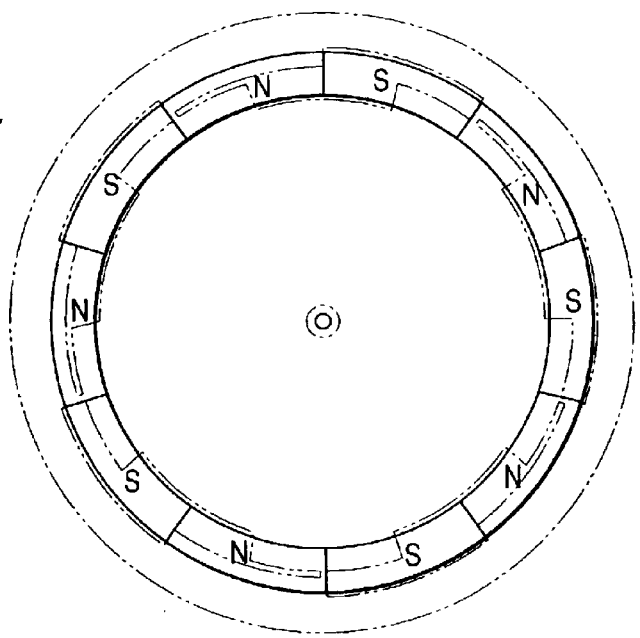
FIG. 15 is a view for explaining the rotating operation of the magnet of the motor shown in FIG. 9.

In the state shown in FIG. 12, the coil 22 is energized to excite the first magnetic pole portions 23*a* to 23*e* to the N pole and the second magnetic pole portions 24*a* to 24*e* to the S pole. The magnet 21 starts rotating clockwise due to magnetic fluxes that cross between the first magnetic pole portions 23*a* to 23*e* and the second magnetic pole portions 24*a* to 24*e*. Almost simultaneously when the state shown in FIG. 13 is set, energization to the coil 22 is stopped. The magnet 21 is further rotated clockwise by the inertial force of the magnet 21 and weight 25. At this time, the magnet 21 is on the clockwise side of a portion at which the central portion of the pole of the magnet 21 opposes the central portion of the first magnetic pole portions 23*a* to 23*e* and second magnetic pole portions 24*a* to 24*e*. In this state, the coil 22 is energized in the reverse direction to excite the first magnetic pole portions 23*a* to 23*e* to the S pole and the second magnetic pole portions 24*a* to 24*e* to the N pole. The magnet 21 further rotates clockwise until the state shown in FIG. 15 is obtained.

After this, the magnet 21 serving as a rotor is rotated to a position corresponding to the energization phase by switching the energization to the coil 22.

In the motor shown in FIG. 9, the magnetic pole portions of the second stator 24 are formed as comb teeth extending in the radiation direction, like the first magnetic pole portions 23*a* to 23*e*. However, the second stator 24 may have a simple flat plate shape as long as it opposes the first magnetic pole portions 23*a* to 23*e*. When the second stator 24 has a simple flat plate shape, magnetic fluxes generated by the coil 22 pass between the comb-tooth-shaped first magnetic pole portions 23*a* to 23*e* of the stator 23 and the projection positions of the shapes of the first magnetic pole portions 23*a* to 23*e* onto the flat surface of the second stator 24. At this time, the projection positions of the shapes of the first magnetic pole portions 23*a* to 23*e* onto the flat surface of the second stator 24 are excited to the opposite pole of the first magnetic pole portions 23*a* to 23*e*. The projection positions of the shapes of the first positioning stator portions onto the second stator 24 are rarely excited.

The arrangement method of the positioning stator portions is also not limited to the above embodiment. For example, when notches are formed in the second stator 24 at positions opposite to the first positioning stator portions to form gaps, the connection portions between the first magnetic pole portions 23*a* to 23*e* and the positioning stator portions 23*g* to 23*k* need not be made thin. The reason for this is as follows. Since the positioning stator portions 23*g* to 23*k* have no members formed from a soft magnetic material at opposite positions, the positioning stator portions 23*g* to 23*k* are hard to excite.

To make the motor thin in the direction of rotational axis, preferably, the positioning stator portions are arranged in the radial direction of the first magnetic pole portions 23*a* to 23*e* or second magnetic pole portions 24*a* to 24*e* such that the positioning stator portions do not project from the first or second magnetic pole portions in the direction of rotational axis of the rotor.

Figure 16:
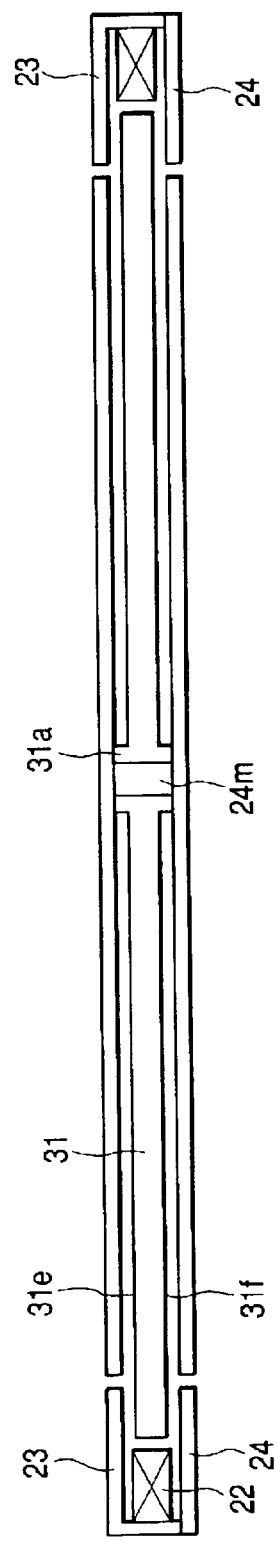
FIG. 16 is a sectional view of the motor shown in FIG. 9 in the axial direction in an assembled state when the magnet of the motor has a disc shape.

In this embodiment, a pager motor has been described. However, the motor can also be used as a simple stepping motor when the weight 25 on the inner peripheral side of the magnet 21 is omitted. If the motor is to be used as a stepping motor having no weight 25, the magnet 21 need not always be hollow and may have a simple disc shape. FIG. 16 is a sectional view of this motor in the direction of rotational axis.

The motor shown in FIG. 16 is different from that shown in FIG. 10 in that the motor has no weight, and a magnet 31 is not hollow but has a disc shape. At least one of two opposite surfaces 31*e* and 31*f* of the magnet 31 is divided into a plurality of parts in a rotational direction about the rotational axis. The divided parts are alternately magnetized to opposite poles. The other surface 31*f* of the magnet 31 is also preferably circumferentially divided into a plurality of parts, which are magnetized to poles, though the parts may be unmagnetized at all. A bearing portion 31a is formed at the central portion of the magnet 31 and fitted on the nib 24m of the second stator 24.

Figure 17:
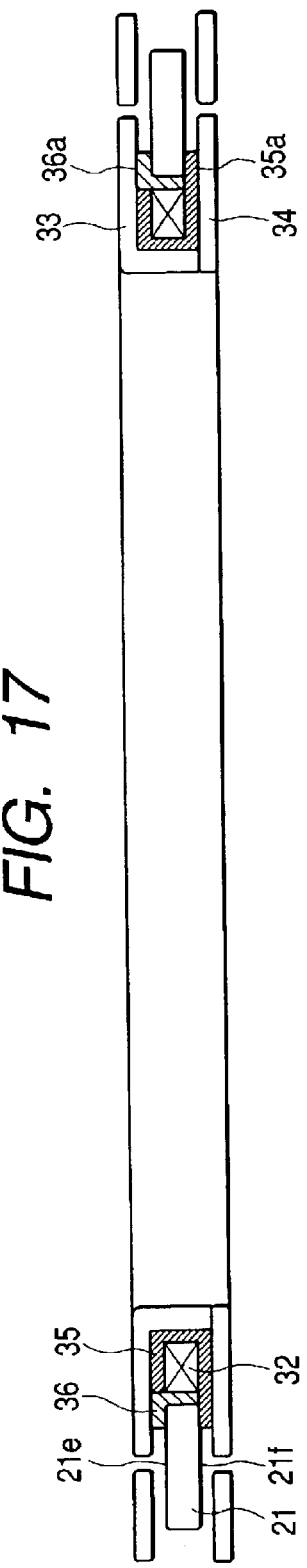
FIG. 17 is a sectional view of a pager motor according to still another embodiment of the present invention in the axial direction in an assembled state.
Figure 18:
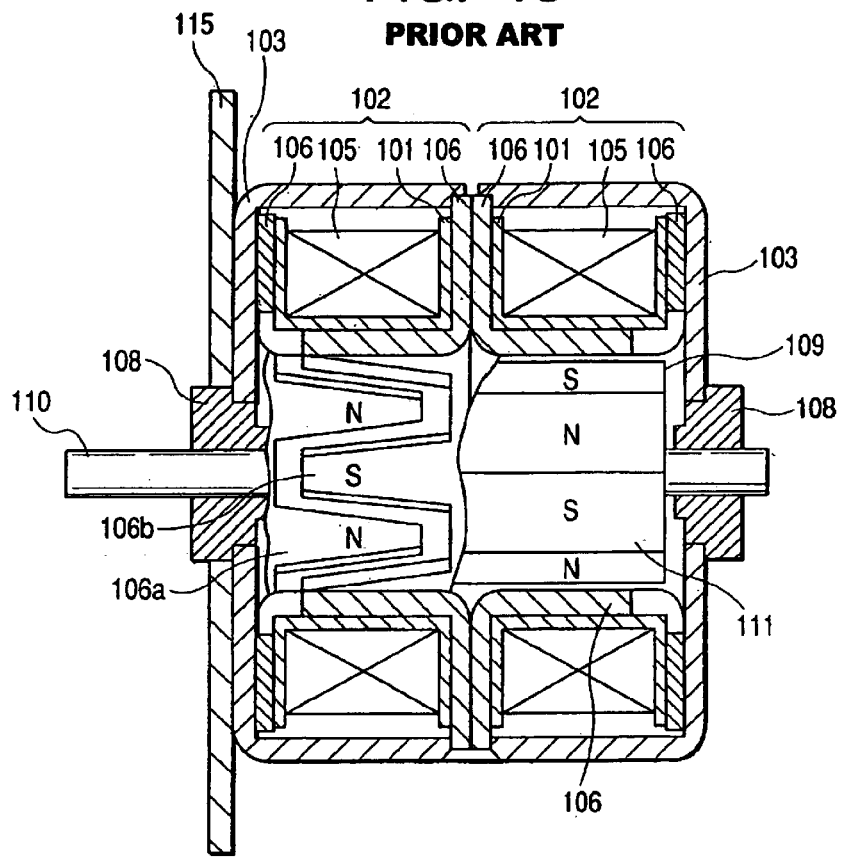
FIG. 18 is a sectional view of a conventional stepping motor.
Figure 19:
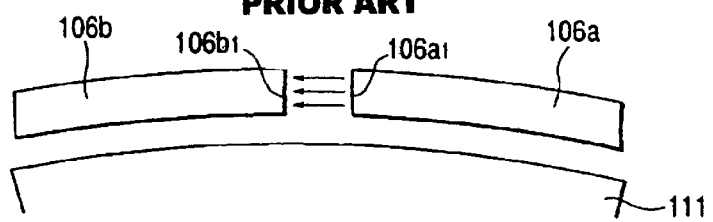
FIG. 19 is a sectional view showing magnetic fluxes that flow from the stator of the conventional stepping motor.
Figure 20:
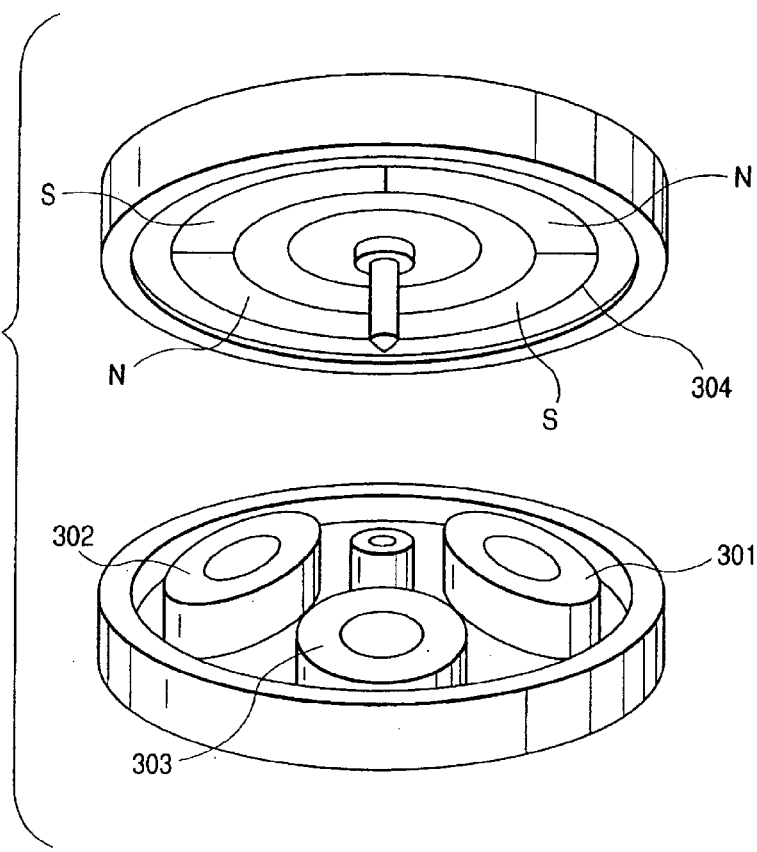
FIG. 20 is a perspective view showing a conventional flat motor.
Figure 21:
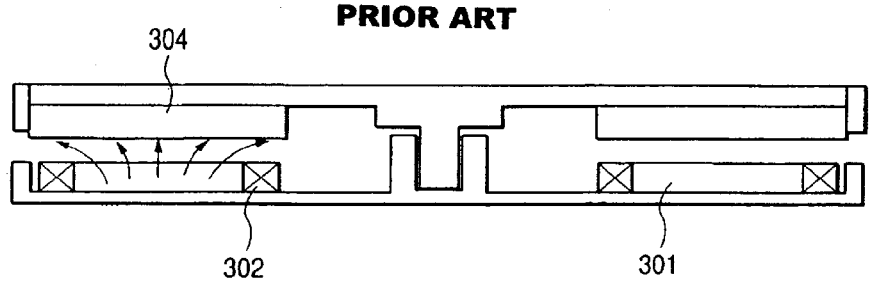
FIG. 21 is a sectional view showing magnetic fluxes that flow from the stator of the motor shown in FIG. 20.

If the magnet has no weight inside, the coil may be arranged to oppose not the outer peripheral surface but the inner peripheral surface of the magnet. FIG. 17 is a sectional view of a motor in an assembled state in which a coil is arranged on the inner peripheral side of a magnet. This motor will be described mainly in association with an arrangement different from the motor shown in FIG. 9.

A coil 32 has a cylindrical shape and is wound on a bobbin 35 made of an insulating material. The outer peripheral surface of the coil 32 opposes the inner peripheral surface of the magnet 21. A first stator 33 is made of a soft magnetic material and has n/2 first magnetic pole portions, like the first stator 23 shown in FIG. 9, when the number of divided poles of the magnet 21 is "n". The first magnetic pole portions oppose the surface 21e of the magnet 21 via a predetermined gap and are formed into comb teeth extending in the radial direction of the magnet 21.

The first stator 33 also has n/2 positioning stator portions which are formed on the outer peripheral side of the first magnetic pole portions while integrated with the first magnetic pole portions. The positioning stator portions are also formed into comb teeth extending in the radial direction of the magnet 21.

The first stator 33 and second stator 34 are connected on the inner peripheral side of the coil 32. The bobbin 35 has a rib 35a. A gap is held between the magnet 21 and the second stator 34 by the rib 35a. In addition, a ring 36 is arranged on the outer peripheral side of the bobbin 35. A gap is held between the magnet 21 and the first stator 33 by a rib 36a of the ring 36.

According to this arrangement, since no member need to be arranged at the central portion of the motor, a ring-shaped motor can be formed.

What is claimed is:

1. A motor comprising:
   a rotor having at least one flat surface divided in a rotational direction and alternately magnetized to opposite poles;
   a coil opposing one of an inner peripheral surface and an outer peripheral surface of said rotor, wherein a central position of the coil matches that of said rotor;
   first magnetic pole portions opposing the one flat surface of said rotor, formed from a plurality of teeth extending in a radial direction of said rotor, and excited by said coil;
   second magnetic pole portions formed on an opposite side of said rotor relative to said first magnetic pole portions at positions opposing said first magnetic pole portions; and
   alignment portions which hold a center of a pole of said rotor at a position shifted from a line which connects a center of said first magnetic pole portions and a center of rotation of said rotor when said coil is not energized, wherein said alignment portions are formed from a plurality of teeth extending in the radial direction of said rotor to be flush with said first magnetic pole portions.

2. A motor according to claim 1, wherein said alignment portions are connected to said first magnetic pole portions.

3. A motor comprising:
   a rotor having at least one flat surface divided in a rotational direction and alternately magnetized to opposite poles;
   a coil opposing one of an inner peripheral surface and an outer peripheral surface of said rotor;
   first magnetic pole portions opposing the one flat surface of said rotor, formed from a plurality of teeth extending in a radial direction of said rotor, and excited by said coil;
   second magnetic pole portions formed on an opposite side of said rotor relative to said first magnetic pole portions at positions opposing said first magnetic pole portions, and
   alignment portions which hold a center of a pole of said rotor at a position shifted from a line which connects a center of said first magnetic pole portions and a center of rotation of said rotor when said coil is not energized,
   wherein said alignment portions are formed from a plurality of teeth extending in the radial direction of said rotor to be flush with said first magnetic pole portions; and
   wherein when said coil opposes the outer peripheral surface of said rotor, said alignment portions are formed on an inner peripheral side of said first magnetic pole portions, and when said coil opposes the inner peripheral surface of said rotor, said alignment portions are formed on an outer peripheral side of said first magnetic pole portions.

4. A motor comprising:
   a rotor having at least one flat surface divided in a rotational direction and alternately magnetized to opposite poles;
   a coil opposing one of an inner peripheral surface and an outer peripheral surface of said rotor;
   first magnetic pole portions opposing the one flat surface of said rotor, formed from a plurality of teeth extending in a radial direction of said rotor, and excited by said coil;
   second magnetic pole portions formed on an opposite side of said rotor relative to said first magnetic pole portions at positions opposing said first magnetic pole portions; and
   alignment portions which hold a center of a pole of said rotor at a position shifted from a line which connects a center of said first magnetic pole portions and a center of rotation of said rotor when said coil is not energized;
   wherein said coil opposes the outer peripheral surface of said rotor, and said rotor has, on an inner peripheral side, a fixed weight whose mass is unbalanced.

5. A motor comprising:
   a rotor having at least one flat surface divided in a rotational direction and alternately magnetized to opposite poles;
   a coil opposing one of an inner peripheral surface and an outer peripheral surface of said rotor, wherein a central position of the coil matches that of said rotor;
   first magnetic pole portions opposing the one flat surface of said rotor, formed from a plurality of teeth extending in a radial direction of said rotor, and excited by said coil;
   second magnetic pole portions formed on an opposite side of said rotor relative to said first magnetic pole portions at positions opposing said first magnetic pole portions; and
   alignment portions opposing the flat surface of said rotor and offset relative to said first magnetic pole portions on an inner peripheral side or outer peripheral side of said first magnetic pole portions.

6. A motor according to claim 5, wherein said alignment portions are formed from a plurality of teeth extending in the radial direction of said rotor to be flush with said first magnetic pole portions.

7. A motor comprising:

a rotor having at least one flat surface divided in a rotational direction and alternately magnetized to opposite poles;

a coil opposing one of an inner peripheral surface and an outer peripheral surface of said rotor;

first magnetic pole portions opposing the one flat surface of said rotor, formed from a plurality of teeth extending in a radial direction of said rotor, and excited by said coil;

second magnetic pole portions formed on an opposite side of said rotor relative to said first magnetic pole portions at positions opposing said first magnetic pole portions; and alignment portions opposing the flat surface of said rotor and offset relative to said first magnetic pole portions on an inner peripheral side or outer peripheral side of said first magnetic pole portions, and wherein said alignment portions are formed from a plurality of teeth extending in the radial direction of said rotor to be flush with said first magnetic pole portions, and wherein when said coil opposes the outer peripheral surface of said rotor, said alignment portions are formed on an inner peripheral side of said first magnetic pole portions, and when said coil opposes the inner peripheral surface of said rotor, said alignment portions are formed on an outer peripheral side of said first magnetic pole portions.

8. A motor comprising:

a rotor having at least one flat surface divided in a rotational direction and alternately magnetized to opposite poles;

a coil opposing one of an inner peripheral surface and an outer peripheral surface of said rotor;

first magnetic pole portions opposing the one flat surface of said rotor, formed from a plurality of teeth extending in a radial direction of said rotor, and excited by said coil;

second magnetic pole portions formed on an opposite side of said rotor relative to said first magnetic pole portions at positions opposing said first magnetic pole portions; and alignment portions opposing the flat surface of said rotor and offset relative to said first magnetic pole portions on an inner peripheral side or outer peripheral side of said first magnetic pole portions, wherein said coil opposes the outer peripheral surface of said rotor, and said rotor has, on an inner peripheral side, a fixed weight whose mass is unbalanced.

9. A motor comprising:

a rotor having at least one flat surface divided in a rotational direction and alternately magnetized to opposite poles;

a coil opposing an outer peripheral surface of said rotor, wherein a central position of said coil matches that of said rotor;

first magnetic pole portions opposing the one flat surface of said rotor, formed from a plurality of teeth extending in a radial direction of said rotor, and excited by said coil;

second magnetic pole portions formed on an opposite side of said rotor relative to said first magnetic pole portions at positions opposing said first magnetic pole portions; and alignment portions which hold a center of a pole of said rotor to a position shifted from a line which connects a center of said first magnetic pole portions and a center of rotation of said rotor when said coil is not energized, wherein said alignment portions are formed from a plurality of teeth extending in the radial direction of said rotor to be flush with said first magnetic pole portions.

10. A motor comprising:

a rotor having at least one flat surface divided in a rotational direction and alternately magnetized to opposite poles;

a coil opposing an outer peripheral surface of said rotor, wherein a central position of said coil matches that of said rotor;

first magnetic pole portions opposing the one flat surface of said rotor, formed from a plurality of teeth extending in a radial direction of said rotor, and excited by said coil;

second magnetic pole portions formed on an opposite side of said rotor relative to said first magnetic pole portions at positions opposing said first magnetic pole portions; and alignment portions opposing the flat surface of said rotor and offset relative to said first magnetic pole portions on an inner peripheral side of said first magnetic pole portions.

11. A motor according to claim 10, wherein said alignment portions are formed from a plurality of teeth extending in the radial direction of said rotor to be flush with said first magnetic pole portions.

* * * * *

UNITED STATES PATENT AND TRADEMARK OFFICE
CERTIFICATE OF CORRECTION

PATENT NO. : 6,897,579 B2
DATED : May 24, 2005
INVENTOR(S) : Chikara Aoshima

It is certified that error appears in the above-identified patent and that said Letters Patent is hereby corrected as shown below:

Column 11,
Line 2, "through" should read -- though --.

Column 15,
Line 23, "and" should be deleted.

Signed and Sealed this

Fourth Day of October, 2005

JON W. DUDAS
*Director of the United States Patent and Trademark Office*